United States Patent

Williams

[11] Patent Number: 5,896,390
[45] Date of Patent: Apr. 20, 1999

[54] TWO WIRE, SUB-RATE 2B1Q ISDN ARCHITECTURE

[75] Inventor: Philip David Williams, Madison, Ala.

[73] Assignee: Adtran, Inc., Huntsville, Ala.

[21] Appl. No.: 08/803,986

[22] Filed: Feb. 21, 1997

[51] Int. Cl.[6] .................. H04J 3/22; H04J 3/12
[52] U.S. Cl. .............. 370/466; 370/545; 370/524; 379/93.01
[58] Field of Search ............... 370/468, 524, 370/535, 536, 543, 419, 420, 466, 545, 463; 379/93.01, 93.05, 93.16

[56] References Cited

U.S. PATENT DOCUMENTS

| | | | |
|---|---|---|---|
| 4,924,492 | 5/1990 | Gitlin et al. | 379/93 |
| 5,251,210 | 10/1993 | Mann et al. | 370/84 |
| 5,351,239 | 9/1994 | Black et al. | 370/84 |
| 5,473,613 | 12/1995 | Bliven | 370/112 |
| 5,598,413 | 1/1997 | Sansom et al. | 370/468 |
| 5,610,922 | 3/1997 | Balatoni | 370/468 |
| 5,668,814 | 9/1997 | Balatoni | 370/540 |

Primary Examiner—Chau Nguyen
Assistant Examiner—Soon-Dong Hyun
Attorney, Agent, or Firm—Charles E. Wands

[57] ABSTRACT

A sub (half)-rate DDS channel transport network architecture is configured to drive each of a ISDN transceiver unit of an OCU DP at one end of a two-wire path and the ISDN transceiver unit of a DDS termination unit at an opposite end of the two-wire path at one-half the normal clock rate, which reduces the operating frequency for rates of 56 kbps and 64 kbps. This sub-rate operation decreases its vulnerability to interference sources such as bridge taps. It also offers a trade-off against loop loss, enabling the effective range of the two-wire DDS circuit to be geographically extended, while complying with applicable industry standards for loop deployment and testing.

17 Claims, 1 Drawing Sheet

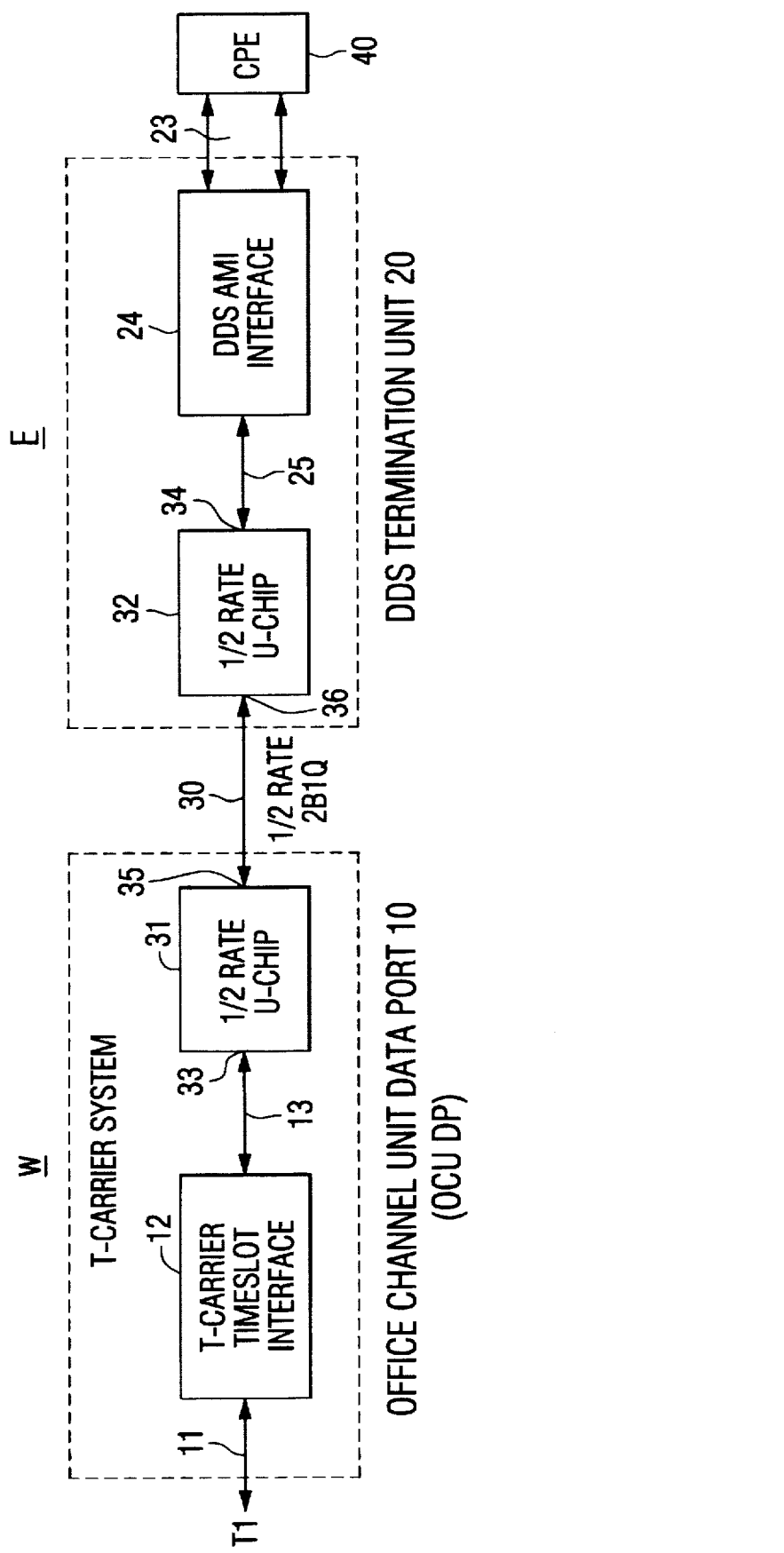

TWO WIRE, SUB-RATE 2B1Q ISDN ARCHITECTURE

FIELD OF THE INVENTION

The present invention relates in general to communication systems, and is particularly directed to the use of a sub-rate integrated services digital network (ISDN) channel for reducing the vulnerability of Dataphone Digital Service (DDS) subscriber lines to impairments such as bridge taps, and to also extend the effective operating range of DDS subscriber lines to distances (on the order of 22 Kft) well beyond those currently possible at T-carrier time slot channel data rates (56 and 64 Kbps).

BACKGROUND OF THE INVENTION

The currently defined American National Standards Institute (ANSI) standard T1. 601 governing 2B1Q modulation, two-wire, full-duplex data transfer with echo cancellation requires that ISDN basic rate digital subscriber lines (having a data rate of 144 kbps, with bidirectional data payload, plus overhead maintenance channels), must not exceed a two-wire loop loss of 42 dB at 40 KHz, for 1300 ohms, resistive. This requirement effectively limits the operational range of a conventional copper cable link (No. 26 (American Wire Gauge) AWG wire) driven by commercially available ISDN transceiver equipment to a distance on the order of 15 Kft.

The U.S. Pat. No. 5,598,413, to M. Sansom et al, (hereinafter referred to as the '413 patent), issued Jan. 28, 1997, entitled: "Four Wire, Half-Rate Architecture with Embedded Differential Delay Compensation for Extending Range of Basic Rate ISDN Communications," assigned to the assignee of the present application and the disclosure of which is herein incorporated successfully addresses this limited range problem by a one-half rate, four-wire, ISDN demultiplexing - multiplexing architecture, that uses an out-of-band maintenance channel for the transport of differential delay compensation information. Advantageously, this scheme is able to extend the normal range of ISDN basic rate digital subscriber lines to a distance on the order of 25 Kft, which is well beyond those currently possible using a repeaterless two-wire transmission path.

My co-pending U.S. Pat. application Ser. No. 08/744,975, filed Nov. 7, 1996, entitled: "Quarter-Rate 2B1Q Architecture with Embedded Differential Delay Compensation for Extending Range of DDS Communications," assigned to the assignee of the present application and the disclosure of which is herein incorporated (hereinafter referred to as the '975 application) solves a similar range limitation problem for four-wire DDS communications, by using a standard ISDN transceiver chip to demultiplex quarter-rate (2B1Q) ISDN channels for the transport of DDS data over a four-wire transmission path between an office channel unit data port (OCU DP) and a customer premises site. As in the scheme described in the '413 patent, by operating at a frequency that is one-quarter of the frequency associated with the ISDN transceivers, the reduced data rate of the four-wire system provides a trade-off against loop loss, increasing the distance over which DDS may be provided, without further stipulation or constraint upon the requirement of loops considered as DDS candidates in terms of loop loss and bridge tap.

Fortunately, because well over 95% of two-wire copper cable links currently installed in the United States do not exceed this (15 Kft) distance, the above described range limitations for the transport of ISDN and DDS channels are not yet a significant problem in most installations. However, because the physical layout of a typical copper link contains one or more bridge taps that are distributed along its length, and many of which are unterminated, the typical copper link is vulnerable to interference.

SUMMARY OF THE INVENTION

In accordance with the present invention, advantage is taken of the ability to drive an ISDN transceiver chip at a reduced clock rate for the transport of DDS signals, which not only serves to mitigate the effect of potential interference sources such as bridge taps, but is also effective to extend the transport range of a DDS channel (to a distance on the order of 22 Kft). In accordance with the sub-rate DDS channel transport network architecture of the present invention, each of the ISDN transceiver unit of an OCU DP at one end of a two-wire path and the ISDN transceiver unit of a DDS termination unit at an opposite end of the two-wire path is driven at only a reduced clock rate—such as one-half the normal clock rate—which not only reduces the operating frequency for rates of 56 kbps and 64 kbps, but mitigates against the impairing effects of interference sources such as bridge taps. It also provides a trade-off against loop loss, and thereby enables the effective range of the two-wire DDS circuit to be geographically extended (up to a distance on the order of 22 kft), while complying with applicable industry standards for loop deployment and testing.

As will be described, at an OCU DP site, a time division multiplexed data stream of a T1-carrier system is coupled to timeslot interface circuitry of the OCU DP. For each time slot of the incoming T1 data stream, the timeslot interface circuitry couples 64 Kbps data bytes to the digital communication port of a sub-rate clocked ISDN transceiver unit. By clocking the ISDN transceiver U-chip at a reduced fraction of the standard ISDN basic rate frequency, such as one-half rate as a non-limiting example, the ISDN transceiver unit outputs a reduced frequency, sub-rate 2B1Q channel (such as a 80 KHz half-rate 2B1Q channel containing two 32 Kb/s bearer channels, and a 16 Kb/s overhead channel), that provides extended range functionality and reduced susceptibility to interference. This sub-rate ISDN channel is transported from the transceiver unit of the OCU DP over the two-wire pair to the ISDN transceiver at the DDS termination unit of a customer premises site. At the DDS termination site, a DDS AMI four-wire interface outputs a standard DDS AMI signal onto a four-wire link for delivery to customer premises equipment.

Since the network architecture of the invention does not employ separate, demultiplexed data paths, it does not require disassembly and reassembly of the 64 Kb/s data stream over multiple transport paths, thereby obviating the need for differential delay compensation circuitry, and thus reducing the complexity of each of the OCU DP and the DDS termination unit. For a DDS 64 Kb/s channel, a half-rate (80 KHz) operation of each ISDN transceiver U-chip also allows for the transport of a 16 Kb/s signalling channel.

BRIEF DESCRIPTION OF THE DRAWINGS

The single FIGURE diagrammatically illustrates the manner in which a DDS network architecture interconnecting an OCU DP and a DDS termination unit station is modified in accordance with the sub-rate ISDN transport architecture of the present invention.

DETAILED DESCRIPTION

Before describing in detail the two-wire, sub-rate ISDN architecture of the present invention, that not only reduces the vulnerability of a DDS subscriber line to potential interference sources/impairments, such as bridge taps, but enables the range of DDS circuits to be extended well beyond normal two-wire loop length 15 Kft), it should be observed that the present invention resides primarily in what is effectively a prescribed set of conventional telecommunication signalling hardware components and attendant supervisory communications microprocessor circuitry therefor, that controls the operations of such components.

Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

In the description to follow, operating boundaries for the invention will be specified in terns of distance rather than loop loss. It will be understood that the sub-rate transport technique herein described will support all data rates currently offered from 2.4–56 kbps, including secondary channel and 64 kbps, and the extended range capability of the present invention will embrace the distance demands of nearly all DDS circuits from 2.4–56 kbps, including secondary channel and 64 kbps.

Referring now to the single Figure, a communication system for transporting two-wire DDS communications between a pair of geographically separated sites is diagrammatically illustrated as comprising an OCU DP 10 disposed at a 'west' site W and a DDS termination unit 20 disposed at an 'east' site E. While the effective length of a (No. 26 AWG copper) communication cable 30 between east site E and west site W may be on the order of 15 Kft or less, it may also be extended beyond that length (for example up to a separation distance on the order of 22 Kft, as described above). For purposes of the present description, it will be also understood that cable 30 has one or more bridge taps distributed therealong between its two termination sites (W and E).

As noted previously, since the physical layout of a typical copper link contains one or more distributed bridge taps, many of which are unterminated, the link is vulnerable to interference. By clocking each of the ISDN transceiver units 31 and 32 at a sub-rate of the normal clock rate, for example, half-rate as a non-limiting example, the effective transport frequency for rates of DDS 56 kbps and 64 kbps channels is effectively reduced, which decreases the impairing effects of such interference sources. This transport frequency reduction also provides a trade-off against loop loss, and thereby enables the effective range of the two-wire DDS circuit to be geographically extended (up to a distance on the order of 22 kft), while complying with applicable industry standards for loop deployment and testing.

More particularly, at the OCU DP west site W, a 1.544 MB/s time division multiplexed (TDM) data stream of a T-carrier system is coupled over a TDM link 11 to timeslot interface circuitry 12 of the OCU DP 10. For a respective one of the twenty-four time slots of the T1 data stream, the timeslot interface circuitry 12 outputs digital data in the form of successive 64 Kbps, eight-bit bytes, via a line 13, to the digital communication port 33 of ISDN transceiver unit 31. A standard full rate (160 Kb/s) ISDN channel is comprised of two 64 kb/s bearer (B1, B2) channels, a 16 kb/s signalling (D) channel, and a 16 Kb/s embedded operations channel (EOC) or maintenance (M) channel. By clocking ISDN transceiver 31 at a fraction (e.g., one-half) of the standard ISDN basic rate frequency (160 KHz), the ISDN transceiver unit 31 can be made to produce a sub-rate 2B1Q channel, which contains two sub-rate bearer (B1, B2) channels, a sub-rate signalling (D) channel, and a sub-rate embedded operations channel (EOC).

As a non-limiting example, clocking the ISDN transceiver 31 may be clocked at half the basic ISDN frequency, so as to cause the transceiver unit 31 to generate an 80 KHz half-rate 2B1Q channel, comprised of two 32 Kb/s bearer (B1, B2) channels, an 8 Kb/s signalling (D) channel, and an 8 Kb/s embedded operations channel (EOC) or maintenance (M) channel. Although the sub-rate clocking parameter of the present example is described as half-rate, it is to be understood that the invention is not-limited to this value. Other reduced clock rates may be employed without departing from the transport functionality of the invention, as long as they accommodate the operating frequency of the DDS channel. Half-rate clocking of the ISDN transceivers is particularly attractive, since the resulting 80 KHz operation readily accommodates a 64 Kbps DDS channel and a 16 Kbps overhead channel. (It will also be understood that the coupling transformer windings are appropriately adjusted for impedance matching purposes at the reduced clock rate.)

The sub (half)-rate ISDN channel is asserted at port 35 of the transceiver unit 31 of OCU DP 10 (at west site W) for transport over two-wire pair 30 to port 36 of transceiver 32 at the DDS termination unit 20 of customer premises (east site E). In a complementary fashion, at the DDS termination site E serving customer premises equipment 40, an industry standard DDS AMI four-wire interface 24 is coupled over line 25 to digital port 34 of half-rate transceiver unit 32.

To illustrate the operation of the sub-rate transport system of the invention at half-rate clocking of the ISDN transceivers, consider the case of a communication from the west end site W to the east end site E of the two-wire network 30. In the transmit direction, the T-carrier timeslot interface 12 is operative to extract a respective channel of an incoming T-carrier format TDM data stream on link 11 into a 64 Kb/s data stream, which is coupled to the half-rate clocked U-chip transceiver unit 31. Half-rate clocked transceiver unit 31 thereby outputs a one-half rate 2B1Q channel onto the two-wire pair 30 for transport to the similarly clocked (half-rate) transceiver unit 32 at the east end site E of the link 30. At the east end site E, the received half-rate ISDN channel is coupled over link 25 to the DDS AMI interface circuit 24, which outputs a standard DDS AMI signal onto the four-wire link 23 for delivery to customer premises equipment 40.

As pointed out previously, a significant advantage of the half -rate, two-wire network architecture of the present invention is the fact that it does not require disassembly and reassembly of the 64 Kb/s data stream over multiple transport paths, as required in the architectures described in the above-referenced '413 patent and '975 application. As a consequence not only does this eliminate the need for differential delay compensation, but it reduces the complexity of each of OCU DP 10 and DDS termination unit 20. Moreover, for a DDS 64 Kb/s channel, the (80 KHz) half-rate operation of each ISDN transceiver U-chip allows for the transport of a 16 Kb/s signalling channel.

As will be appreciated from the foregoing description, the sub (half)-rate DDS channel transport network architecture of the present invention not only mitigates the effect of potential interference sources such as bridge taps, but it can extend the transport range of a DDS channel. Namely, driving each of the ISDN transceiver unit of an OCU DP at one end of a two-wire path and the ISDN transceiver unit of a DDS termination unit at an opposite end of the two-wire path at one-half the normal clock rate reduces the operating frequency for rates of 56 kbps and 64 kbps, and thus reduces its vulnerability to interference sources such as bridge taps. It also offers a trade-off against loop loss, enabling the effective range of the two-wire DDS circuit to be geographically extended, while complying with applicable industry standards for loop deployment and testing.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of conducting dataphone digital services (DDS) communications between a first site and a second site comprising the steps of:
    (a) at said first site, receiving a non-disassembled DDS data stream intended for transmission to said second site, and interfacing said non-disassembled DDS data stream onto only a single sub-rate ISDN communication channel;
    (b) transmitting said sub-rate ISDN communication channel over no more than a two-wire path to said second site; and
    (c) at said second site, receiving said sub-rate ISDN communication channel from said two-wire path and recovering exclusively therefrom the entirety of the contents of said non-disassembled DDS data.

2. A method according to claim 1, wherein step (c) comprises
    at said second site, receiving said sub-rate ISDN communication channel from said two-wire path and supplying a DDS AMI signal containing the entirety of the contents of said non-disassembled DDS data over a four-wire link to customer premises equipment.

3. A method according to claim 2, further comprising the steps of:
    (d) at said second site, receiving a DDS AMI signal containing non-disassembled DDS data from a four-wire link coupled to customer premises equipment, and interfacing a DDS data stream containing said non-disassembled DDS data onto a further sub-rate ISDN communication channel;
    (e) transmitting said further sub-rate ISDN communication channel over no more than said two-wire path to said first site; and
    (f) at said first site, receiving said further sub-rate ISDN communication channel exclusively from said two-wire path and supplying a DDS data stream containing the entirety of the contents of said non-disassembled DDS data onto a T-carrier link.

4. A method according to claim 1, wherein said sub-rate ISDN communication channel is a half-rate ISDN communication channel.

5. A method according to claim 1, wherein said two-wire path comprises a repeaterless transmission path having an effective allowable maximum length defined by prescribed industry performance standards.

6. A method according to claim 1, wherein said two-wire path conforms with the American National Standards Institute (ANSI) standard governing 2B1Q modulation, two-wire, full-duplex data transfer with echo cancellation.

7. A method according to claim 6, wherein said two-wire path comprises a No. 26 American Wire Gauge copper wire path having a length greater than fifteen Kft.

8. A method according to claim 7, wherein said two-wire path has a length between fifteen and twenty-two Kft.

9. An arrangement for conducting dataphone digital services (DDS) communications over no more than a two-wire path between a first site and a second site comprising:
    at said first site, a first ISDN transceiver unit to which a non-disassembled DDS data stream is coupled, said first ISDN transceiver unit being operative to transmit a sub-rate ISDN communication channel containing said non-disassembled DDS data stream exclusively over said two-wire path; and
    at said second site, a second ISDN transceiver unit which is operative to receive said sub-rate ISDN communication channel from said two-wire path and to supply a DDS AMI signal containing the entirety of the contents of said disassembled DDS data over a four-wire link to customer premises equipment.

10. An arrangement according to claim 9, wherein said second ISDN transceiver unit is operative to receive a DDS AMI signal containing a further non-disassembled DDS data stream from said four-wire link and to transmit a further sub-rate ISDN communication channel containing said further non-disassembled DDS data stream exclusively over said two-wire path to said first ISDN transceiver unit, and wherein said first ISDN transceiver unit is operative to receive said further sub-rate ISDN communication channel and to output said further non-disassembled DDS data stream onto a T-carrier link.

11. An arrangement according to claim 9, wherein said sub-rate ISDN communication channel is a half-rate ISDN communication channel.

12. An arrangement according to claim 9, wherein said first ISDN transceiver unit comprises an office channel unit data port having a timeslot interface circuit to which said DDS data steam from a T-carrier system is coupled, and an ISDN transceiver circuit to which digital data is coupled from said timeslot interface circuit, and wherein said ISDN transceiver circuit is clocked at one-half ISDN basic rate frequency so as to output a half-rate 2B1Q channel, which contains half-rate DDS data bearer channels, and an overhead channel onto said two-wire pair for transmission to said second site.

13. An arrangement according to claim 12, wherein said second ISDN transceiver unit comprises a DDS termination unit having an ISDN transceiver circuit which is operative to receive said half-rate 2B1Q ISDN communication channel from said two-wire pair, and a DDS AMI four-wire interface coupled thereto and operative to output a DDS AMI signal over a four-wire link to customer premises equipment.

14. An arrangement according to claim 9, wherein said two-wire path comprises a repeaterless transmission path having an effective allowable maximum length defined by prescribed industry performance standards.

15. An arrangement according to claim 9, wherein said two-wire path conforms with the American National Standards Institute (ANSI) standard governing 2B1Q modulation, two-wire full-duplex data transfer with echo cancellation.

16. An arrangement according to claim 15, wherein said two-wire path comprises a No. 26 American Wire Gauge copper wire path having a length greater than fifteen Kft.

17. An arrangement according to claim 16, wherein said two-wire path has a length between fifteen and twenty-two Kft.

* * * * *